United States Patent

Boitiaux et al.

[11] Patent Number: 5,417,844
[45] Date of Patent: May 23, 1995

[54] SELECTIVE HYDROGENATION OF DIOLEFINS IN STEAM CRACKING PETROL ON CATALYSTS BASED ON A SUPPORT METAL IN WHICH AN ORGANIC COMPOUND HAS BEEN INCORPORATED PRIOR TO LOADING INTO THE REACTOR

[75] Inventors: Jean-Paul Boitiaux, Poissy; Patrick Sarrazin, Rueil Malmaison, both of France

[73] Assignee: Institut Francais du Petrole, France

[21] Appl. No.: 978,074

[22] Filed: Nov. 18, 1992

Related U.S. Application Data

[63] Continuation of Ser. No. 730,094, Jul. 5, 1991, abandoned.

[30] Foreign Application Priority Data

Jul. 13, 1990 [FR] France .................. 90 09079

[51] Int. Cl.⁶ .................. C10G 45/04; C10G 45/06
[52] U.S. Cl. .................. 208/143; 208/144; 208/260; 585/260; 585/261; 585/262; 585/274; 585/277
[58] Field of Search .................. 208/143, 260, 144; 585/260, 261, 262, 277, 274

[56] References Cited

U.S. PATENT DOCUMENTS

| | | | |
|---|---|---|---|
| 3,472,763 | 10/1969 | Cosyns et al. | 208/143 |
| 3,919,341 | 11/1975 | Germanas et al. | 585/668 |
| 4,225,461 | 9/1980 | Cosyns et al. | 502/223 |
| 4,530,917 | 7/1985 | Berrebi | 502/31 |
| 4,719,195 | 1/1988 | Toulhoat et al. | 502/31 |
| 4,734,540 | 3/1988 | Gattuso et al. | 585/260 |
| 4,983,558 | 1/1991 | Born et al. | 208/111 |

FOREIGN PATENT DOCUMENTS 979307 1/1965 United Kingdom .

*Primary Examiner*—Asok Pal
*Assistant Examiner*—Walter D. Griffin
*Attorney, Agent, or Firm*—Antonelli, Terry, Stout & Kraus

[57] ABSTRACT

The invention relates to a process for the selective hydrogenation of diolefins in steam cracking petrol in the presence of a nickel catalyst and is characterized in that prior to the use of the catalyst, a suphur-containing organic compound is incorporated into the catalyst outside of the reactor.

10 Claims, No Drawings

SELECTIVE HYDROGENATION OF DIOLEFINS IN STEAM CRACKING PETROL ON CATALYSTS BASED ON A SUPPORT METAL IN WHICH AN ORGANIC COMPOUND HAS BEEN INCORPORATED PRIOR TO LOADING INTO THE REACTOR

This application is a continuation application of application of Ser. No. 730,094, filed Jul. 5, 1991, now abandoned.

The present invention relates to the selective hydrogenation of diolefins in liquid hydrocarbon fractions, such as e.g. steam cracking in petrol. The latter contains gum-producing compounds in the form of diolefins mixed with olefinic compounds and aromatic compounds. In order to be able to use these olefinic compounds and aromatic compounds, it is necessary to selectively hydrogenate the diolefins.

Such treatments are generally carried out on metal catalyst deposited on an amorphous or crystalline support. The metals used are those of group VIII and among the latter, particular reference is made to nickel which is widely used.

However, nickel catalysts are not sufficiently selective, because they have a marked tendency to hydrogenate a significant part of the olefins contained in the charge, even when hydrogenation operations are performed at low pressures, of approximately 30 to 50 bar, and at low temperatures, between 50° and 180° C.

It is known that the selectivity of these catalysts can be improved by injecting sulphur compounds prior to the contacting of the catalyst and the reactive charge (British Patent 979307). These compounds can be chosen from among thiophene, thiophan, alkyl mono-sulphides, such as dimethyl sulphide, diethyl sulphide, dipropyl sulphide, propyl methyl sulphide, etc.

However, this sulphurization is difficult to carry out, because it is necessary for the sulphur compound to be very evenly distributed over the complete catalyst bed, so as to bring about a marked effect on the selectivity. Moreover, this procedure is expensive and takes a long time, resulting in production losses.

The lack of intrinsic selectivity on the part of the nickel catalyst not only applies relative to olefins, but also relative to aromatics. Thus, on starting a nickel catalyst, even when this is of a selective nature, by a sulphur compound of the type indicated hereinbefore, it is necessary to use a non-reactive starting charge, which contains no diolefin, no olefin and very small aromatic quantities. Thus, the hydrogenation of diolefins or possibly olefins on very active new catalysts, leads to an adequate heat emission to raise the temperature of the catalyst to levels well above 200° C., which can cause the hydrogenation of aromatics. The latter reaction is even more exothermic and the temperature can exceed 600° C., which causes the cracking of the hydrocarbons, which is also very exothermic. Thus, the temperatures reached during these runaway reactions can exceed the design temperatures of the steel reactors, which makes it necessary to not only replace the catalyst charge, but also the reactor.

The object of the invention is therefore to use a means for selectivizing or in other words sufficiently inhibiting the nickel catalyst charge, so as not to give rise to the risk of such runaway reactions, even when a reactive charge is used for starting up the reactor. It has surprisingly been found that the introduction of organic moderators onto the catalyst in the absence of hydrogen and prior to its loading into the reactor and prior to the activation of the catalyst by hydrogen allows a very significant moderation of the catalyst, so that it can be started with a reactive charge. Without limiting the scope of the invention, the moderators used can be sulphur compounds and in particular organic sulphur compounds decomposable in activation treatments of the catalyst in the reactor. These activations are performed in neutral or reducing atmospheres at temperatures between 250° and 600° C. and preferably between 250° and 450° C. Moreover, the treatment of the catalyst prior to its loading significantly increases its stability and therefore its life.

Belgian Patent BE-A-676321 and German Patent 1470485 describe the use of a sulphur compound, but in the presence of hydrogen.

The organic sulphur compounds usable in the present invention are in particular organic aryl or alkyl sulphides or organic aryl alkyl or alkyl aryl sulphides. Reference is e.g. made to butyl ethyl sulphide, diallyl sulphide, dibutyl sulphide, dipropyl sulphide, dimethyl thiophene and ethyl thiophene.

In more general terms it is possible to use thiols (thio alcohols, mercaptans, thiophenols) of formula $R_1-SH$, in which $R_1$ is an organic radical, thioethers of formula $R_1-S-R_2$, in which $R_1$ and $R_2$ are the same or different, organic disulphides of formula $R_1-S-S-R_2$ and disulphides of the type $HO-R_1-S-S-R_2-OH$, taken separately or in combination.

It is also possible to choose an organic sulphur agent selected from the group constituted by thiodiazoles, organic thioacids, thioamides, thioesters and thiophenols. For example, reference is made to thiobenzoic acid, thiocresols, 3,3-thiodipropionitrile acid, 2,3,6-trimethyl thiophenol, methyl thioglycollate, 2-thiol-naphthalene, phenyl isothiocyanate, 2-phenyl-thiophenol, thioacetamide, thiobenzamide, 2,6-dimethyl-thiophenol, 3,5-dimethyl-thiophenol, 2,2'-dinitrodiphenyl-disulphide, 2,5-dithiobiurea, ethyl thioglycollate, 2-methoxy-thiophenol and 3-methoxythiophenol.

The invention can also be performed in the presence of other sulphur additive types. Thus, reference is made to mercapto alcohols of formula:

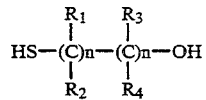

in which n and m are integers, $R_1$, $R_2$, $R_3$ and $R_4$, which are the same or different, being hydrogen atoms or alkyl, aryl, aralkyl and similar organic radicals with 1 to 20, and preferably 1 to 6 carbon atoms per molecule and preferably n=1–10 (e.g. 1–2) and m=1–10 (example 1).

Reference can also be made to monothioglycols, such as monothioethylene glycol, dithio glycols such as dithiopropylene glycol, dithiobenzenes such as dithioresorcinol, heterocycles substituted by mercapto groups such as mercaptopyridine, mercaptopyrimidine, etc., dihydroxyalkyl sulphides such as thiodiethylene glycol ($S(CH_2CH_2OH)_2$), thiodipropylene glycol, etc., diaryl sulphides such as diphenyl sulphide, diaralkyl sulphides such as dibenzyl sulphide, cyclic thioethers and their substituted derivatives (ethylene sulphide, thiophene, thiazole, thiopyrone, thioxanthone, thioxanthydrol, 1,4-thioxane, etc.), S alkyl ethers of heterocycles substituted by mercaptans (2-methylthio-4,6-diaminopyrimidine), etc.

From among the preceding compounds more particular reference is made to dimethyl sulphoxide, ethyl thiol ethanol, thioglycolic acid, dithioglycol and organic disulphides of formula HO—$R_1$—S—S—$R_2$—OH, as stated hereinbefore, or HO—$(CH_2)_x$—S—$(CH_2)_{x'}$—S—$(CH_2)_{x''}$—OH in which $R_1$ and $R_2$ are defined as hereinbefore, in which x, x', x'', in which are the same or different, are an integer.

In exemplified manner, more particular reference can be made to diethanol disulphide or 2,2-dithio bis ethanol (D.E.O.D.S.) of formula HO—$C_2H_4$—S—S—$C_2H_4$—OH, which is in particular soluble in water, glycols and polyglycols.

It is also possible to use a polysulphide of formula R—$(S)_n$—R', in which n is an integer between 3 and 20, preferably between 4 and 8 and more particularly 5 and 7, R and R', which are the same or different, represent organic radicals containing in each case 1 to 150 carbon atoms per molecule, preferably either 10 to 60 or 5 to 40 and more particularly 7 to 16 carbon atoms, said radicals being chosen from the group constituted by alkyl radicals, i.e. saturated or unsaturated, straight or branched, or of the naphthene type, aryl radicals, alkyl aryl radicals and aryl alkyl radicals, these radicals being able to have at least one heteroatom and R' can optionally also be a hydrogen atom.

As a preferred example of polysulphide, reference is made to ditert. dodecyl polysulphide (n=5), in which R and R' are in each case a tert. dodecyl radical. This product is e.g. marketed by Elf Aquitaine under the name TPS 32, because it contains 32% by weight of sulphur. Reference is also made to ditert. nonyl polysulphide (n=5), in which R and R' are in each case a tert. nonyl radical.

The pretreatment agent is used, diluted in an adequate solvent, which in particular depends on the nature of the sulphurization agent. The chosen solvent can be one of the following solvents, used singly or in mixture:
- a light petrol e.g. boiling at between approximately 60° and 95° C.,
- a hexane-type petrol boiling at between approximately 63° and 68° C.,
- a F-type petrol boiling at between 100° and 160° C. and generally containing 10 to 20% of aromatic hydrocarbons, e.g. 15% by volume,
- a white spirit boiling at between approximately 150° and 250° C. and generally containing 14 to 22% of aromatic hydrocarbons, e.g. 17% by volume,
- or any other hydrocarbon or non-hydrocarbon fraction, equivalent to the aforementioned petrol types.

The agent can be used in another solvent such as e.g. alcohols (methanol, ethanol, propanol, etc.), aldehydes, ketones, ethers, alcohols, polyalcohols, acids and polyacids, water and glycols.

According to the invention, into the catalyst is advantageously incorporated 0.05 to 10 and preferably 0.2 to 1% of sulphur, expressed by weight of sulphur, based on the catalyst mass.

The following examples illustrate the invention without limiting its scope.

EXAMPLE 1 (COMPARISON)

In a diameter 3 cm steel tube are placed 100 cm³ of catalyst LD 241 produced by Procatalyse containing 10% nickel and supported on alumina. This catalyst, which is presently used for hydrogenating steam cracking petrol, is activated under the following conditions:

| | |
|---|---|
| Hydrogen flow rate | 30 l/h |
| Pressure | atmospheric |
| Temperature | 400° C. |
| Duration | 15 hours. |

The catalyst is cooled under a hydrogen flow and the installation is then purged with nitrogen. The hydrogenating activity of the catalyst is then measured with a hydrocarbon charge containing 30% by weight toluene in n-heptane.

This charge is passed in a rising flow with the hydrogen through the catalyst bed under the following conditions:

| | |
|---|---|
| Pressure | 30 bar |
| Temperature | variable between 50 and 70° C. |
| Hydrocarbon flow rate | 200 cm³/h |
| Hydrogen flow rate | 60 l/h |

The degree of hydrogenation is followed by vapour phase chromatography on a 50 m carbowax column.

The results obtained are given in the following Table 1:

TABLE 1

| Temperature | Degree of toluene conversion |
|---|---|
| 50° C. | 12% |
| 70° C. | 29% |

It can be seen that this catalyst very easily hydrogenates aromatic compounds, even at relatively low temperatures. Such a behaviour explains the violent reactions noted during certain starting operations.

EXAMPLE 2 (COMPARISON)

In a diameter 7 cm steel tube are placed 1000 cm³ of the same catalyst as in Example 1. The reactor is provided with an internal thermometer rod and thermocouples on the outer wall. The unit is equipped with rapid nitrogen purging systems for the case where a thermal phenomenon of the violent reaction type occurs. In this case the reactor is automatically connected to an evacuation system and is scavenged by a considerable nitrogen flow.

With the unit under hydrogen at a pressure close to atmospheric pressure, at a rate of 1 l/h, using a pump a steam cracking petrol with the following characteristics is introduced:

| | |
|---|---|
| Distillation range | 39–181° C. |
| Density | 0.834 |
| Sulphur | 150 ppm |
| Dienes | 16% by weight |
| Olefins | 4% by weight |
| Aromatics | 68% by weight |
| Paraffins | 12% by weight |

As soon as the first catalyst layers are wetted with the petrol, there is a temperature rise, which rises with time in the manner indicated in the following Table 2, which gives the internal thermocouple reading relative to the first third of the catalyst bed.

TABLE 2

| TIME | TEMPERATURE (°C.) |
|---|---|
| Start of injection | 40 |
| 1 mn | 40 |
| 4 mn | 45 |
| 5 mn | 52 |
| 6 mn | 58 |
| 7 mn | 70 |
| 8 mn | 100 |
| 9 mn | 120 |

With the temperature limit fixed at 150° C., the reactor was evacuated after 10 min. On unloading, it was found that the catalyst balls had agglomerated in carbon resulting from the polymerization of the petrol.

EXAMPLE 3 (COMPARISON)

The same test as in Example 1 is repeated, but the catalyst is treated with dimethyl sulphide following its activation with hydrogen and under the following conditions.

For 2 h a solution of n-heptane is delivered, which contains 700 mg per liter of dimethyl sulphide and at a rate of 250 cm³/h and a temperature of 50° C. (0.15% sulphur fixed to the catalyst) and then, as in Example 1, the degree of aromatic conversion was measured. The results obtained are given in the following Table 3.

TABLE 3

| TEMPERATURE | DEGREE OF TOLUENE CONVERSION |
|---|---|
| 50° C. | 0% |
| 70° C. | 3.3% |

It can be seen that the dimethyl sulphide treatment in the reactor makes it possible to significantly reduce the hydrogenation of the aromatics.

Substantially the same results are obtained by simultaneously carrying out the activation with hydrogen and the introduction of the sulphur compound.

EXAMPLE 4 (COMPARISON)

The same experiment as in Example 2 is carried out, but using a selectivation treatment similar to that of Example 3. Following the activation of the catalyst with hydrogen, this treatment consists of delivering for 2 h a solution of n-heptane containing 700 mg per liter of dimethyl sulphide, at a rate of 2500 cm³/h and a temperature of 50° C. (0.8% sulphur fixed to the catalyst), followed by the admission of the steam cracking petrol with the characteristics described hereinbefore and in the same way as in Example 2. The temperature rise is less sudden and is limited to about 15°, after which the exothermicity disappears when the complete catalyst bed is wetted.

100 cm³ of catalyst are then placed in a diameter 3 cm tube, said catalyst is reduced in the manner described hereinbefore and undergoes the dimethyl sulphide treatment described in Example 3. This is followed by the measurement of the hydrogenating activity of the catalyst relative to diolefins contained in the aforementioned steam cracking petrol. The test conditions are as follows:

| | |
|---|---|
| Pressure | 30 bar |
| Temperature | 100° C. |
| Hydrocarbon flow rate | 800 cm/h |
| Hydrogen flow rate | 160 l/h |

The performance characteristics were measured by varying the maleic anhydride value (MAV) between the reactor intake and outlet. The charge gives a MAV of 106, the MAV of the products being given as a function of the operating rise in the following Table 4.

TABLE 4

| Operating time in hours | 50 | 100 | 200 | 500 | 750 | 1000 | 2000 |
|---|---|---|---|---|---|---|---|
| MAV of product | 14 | 29 | 32 | 35 | 39 | 42 | 50 |

It can be seen that the catalyst is active, but that the conversion decreases gently, but regularly over a period of time. This is the sign of a fouling caused by the polymerization action of the nickel.

EXAMPLE 5 (ACCORDING TO THE INVENTION)

A batch of catalyst LD 241, whose characteristics are given hereinbefore, is used for preparing catalysts "inhibited" according to the method of the invention. 7 catalysts are prepared in the manner described hereinafter and are identified by the references NiA, NiB, NiC, NiD, NiE, NiF, NiG.

3.1 g of butyl ethyl sulphide are dissolved in 50 cm³ of ethyl alcohol. This alcoholic solution is contacted with 10 g of catalyst in a 250 cm³ Erlenmeyer flask. After 5 minutes all the solution has been absorbed by the solid. Everything is left for 2 hours, after which the solid is dried in the oven at 120° C. for 6 hours. The solid obtained constitutes the catalyst NiA, which contains 0.82% sulphur.

2.8 g of diallyl sulphide are dissolved in 50 cm³ of ethanol and in the same way as hereinbefore the catalyst NiB is prepared, which contains 0.78% sulphur.

3.9 g of dibutyl sulphide are dissolved in 50 cm³ of ethanol and the same procedure as hereinbefore is used for preparing the catalyst NiC, which contains 0.85% sulphur. 3.0 g of dipropyl sulphide are dissolved in 50 cm³ of ethanol and the same procedure as hereinbefore is used for preparing the catalyst NiD, which contains 0.8% sulphur.

3.2 g of dimethyl thiophene are dissolved in 50 cm³ of ethanol and the same procedure as hereinbefore is used for preparing the catalyst NiE which contains 0.9% sulphur.

3.1 g of ethyl thiophene are dissolved in 50 cm³ of ethanol and the same procedure as hereinbefore is used for preparing the catalyst NiF, which contains 0.87% sulphur.

3.9 g of dibutyl sulphide are dissolved in 50 cm³ of heptane and the same procedure as hereinbefore is used for preparing the catalyst NiG, which contains 0.85% sulphur.

EXAMPLE 6 (ACCORDING TO THE INVENTION)

The catalysts of Example 5 are tested in the hydrogenation of toluene at 70° and 120° C. in the same way as in Example 1. The results obtained are given in Table 5.

TABLE 5

| Catalyst | 70° C. | 120° C. |
|---|---|---|
| NiA | 0 | 1.5% |
| NiB | 0 | 1.3% |
| NiC | 0 | 1.6% |
| NiD | 0 | 1.7% |
| NiE | 0 | 1.6% |
| NiF | 0 | 1.2% |

It can be seen that the addition of the sulphur compound outside the reactor makes it possible to significantly inhibit the hydrogenation of toluene. This inhibition is more effective by introducing the dimethyl sulphide into the reactor.

EXAMPLE 7 (ACCORDING TO THE INVENTION)

In the same way as in Example 5, 1000 cm³ of catalyst LD 241 are impregnated with 500 cm³ of an ethanolic solution containing 45.6 g of dibutyl disulphide. After drying in the oven for 6 hours at 120° C., the catalyst NiH is obtained.

In the same way, 1000 cm³ of catalyst LD 241 are impregnated with 500 cm³ of a solution of 35 g of dimethyl thiophene in heptane. After drying, the catalyst NiG is obtained.

The same test as in Example 2 is carried out with the two catalysts NiJ and NiH. The temperature rise does not exceed 10° C. in both cases.

EXAMPLE 7 (ACCORDING TO THE INVENTION)

The catalysts of Example 5 are placed in a diameter 3 cm tube and tested with respect to the hydrogenation of steam cracking petrol as in Example 3. The MAV values obtained at the outlet and as a function of the operating time are given in Table 6.

TABLE 6

| Operating time in hours | MAV of product. | | | | | | |
|---|---|---|---|---|---|---|---|
|  | 50 | 100 | 500 | 750 | 1000 | 2000 | 3000 |
| NiA | 31 | 32 | 33 | 33 | 33 | 34 | 33 |
| NiB | 32 | 34 | 34 | 34 | 34 | 35 | 35 |
| NiC | 29 | 30 | 30 | 28 | 32 | 32 | 32 |
| NiD | 31 | 32 | 32 | 34 | 34 | 33 | 34 |
| NiE | 22 | 28 | 31 | 31 | 32 | 33 | 33 |
| NiF | 24 | 29 | 33 | 34 | 34 | 35 | 35 |
| NiG | 35 | 35 | 33 | 33 | 34 | 35 | 35 |

It can be seen that the catalysts pretreated outside the hydrogenation reactor have no starting problem, more rapidly reach a stable performance level and have a significantly improved time stability.

Example 8 (According to the Invention)

2 kg of catalyst LD 241 are pretreated by ditert. dodecyl sulphide suspended in ethanol, so as to incorporate 0.8% sulphur onto the catalyst. 100 g of this catalyst are placed in a diameter 3 cm tube and its activity in hydrogenating toluene is tested as in Example 1. The results obtained are given in Table 7.

TABLE 7

| Temperature | Degree of conversion of toluene |
|---|---|
| 70° C. | 0% |
| 120° C. | 0.7% |

Thus, the inhibition is satisfactory with this treatment. The hydrogenating activity and stability test is then carried out with the same steam cracking petrol and under the same conditions as in Example 7. The results are given in Table 8.

TABLE 8

| Operating time in hours | 50 | 100 | 500 | 750 | 1000 | 2000 | 3000 |
|---|---|---|---|---|---|---|---|
| MAV of product | 29 | 30 | 30 | 30 | 30 | 32 | 33 |

We claim:

1. A process for the selective hydrogenation of diolefins which comprises hydrogenating diolefins selectively in steam cracking petrol containing the diolefins and at least monoolefins and aromatics within a reactor at pressure of approximately 30 to 50 bar and temperature between 50° and 180° C. in the presence of a hydrogen-activated catalyst containing sulphur and at least one metal of group VIII of the periodic classification of elements deposited on a support, wherein prior to the use of the catalyst and prior to its activation by hydrogen, at least one pretreatment agent comprising an organic compound containing sulphur is incorporated into the catalyst out of the reactor, without reduction and in a liquid phase, and said pretreatment agent is added in an adequate quantity to incorporate 0.05 to 10% of sulphur, expressed in sulphur weight, into the catalyst mass.

2. A process according to claim 1, wherein 0.2 to 1% of sulphur is incorporated into the catalyst mass.

3. A process according to claim 1, wherein the catalyst contains at least nickel as the metal of group VIII.

4. A process according to claim 1, wherein the pretreatment agent is a thioether of formula $R_1$—S—$R_2$, in which $R_1$ and $R_2$, which can be the same or different and taken separately or in combination, are organic radicals selected from the group consisting of alkyl, aryl, alkylaryl and arylalkyl radicals containing 1 to 20 carbon atoms.

5. A process according to claim 1, wherein the pretreatment agent is a thiol of the formula $R_1$—SH, in which $R_1$ is an organic radical selected from the group consisting of alkyl, aryl, alkylaryl and arylalkyl radicals containing 1 to 20 carbon atoms.

6. A process according to claim 1, wherein the pretreatment agent is an organic disulfide of formula $R_1$—S—S—$R_2$, in which $R_1$ and $R_2$, which can be the same or different and taken separately or in combination, are organic radicals selected from the group consisting of alkyl, aryl, alkylaryl and arylalkyl radicals containing 1 to 20 carbon atoms.

7. A process according to claim 1, wherein the pretreatment agent is a disulphide of formula HO—$R_1$—S—S—$R_2$—OH, in which $R_1$ and $R_2$ are organic radicals selected from the group consisting of alkyl, aryl, alkylaryl and arylalkyl radicals containing 1 to 20 carbon atoms.

8. A process according to claim 1, wherein the pretreatment agent is an organic polysulfide of formula R—$(S)_n$—R', in which R and R', which can be the same or different, are organic radicals selected from the group consisting of alkyl aryl, alkylaryl and arylalkyl radicals containing 1 to 150 carbon atoms and in which n is an integer of between 3 and 20.

9. A process according to claim 1, wherein the activation with hydrogen is effected at temperatures between 250° and 600° C. in the reactor.

10. A process for the selective hydrogenation of diolefins in a reactor in the presence of a catalyst which comprises incorporating at least one pretreatment agent comprising an organic compound containing sulphur into a catalyst containing at least one metal of Group VIII of the periodic classification of elements deposited on a support outside of the reactor without reduction and in a liquid state; loading the pretreated catalyst into the reactor; activating the catalyst with hydrogen within the reactor at temperatures between 250° and 600° C.; and effecting selective hydrogenation of diolefins in steam cracking petrol containing the diolefins and at least monoolefins and aromatics within the reactor at pressure of approximately 30 to 50 bar at a temperature between 50° and 180° C. in the presence of the catalyst.

* * * * *